US008000732B2

(12) United States Patent
Albertsson et al.

(10) Patent No.: US 8,000,732 B2
(45) Date of Patent: Aug. 16, 2011

(54) METHODS AND APPARATUS FOR PUSH TO TALK TYPE SERVICE

(75) Inventors: Henrik Albertsson, Stockholm (SE); Jan Holm, Örbyhus (SE); Hubert Przybysz, Hägersten (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 569 days.

(21) Appl. No.: 12/091,093

(22) PCT Filed: Oct. 24, 2006

(86) PCT No.: PCT/EP2006/067724
§ 371 (c)(1),
(2), (4) Date: Jul. 25, 2008

(87) PCT Pub. No.: WO2007/048795
PCT Pub. Date: May 3, 2007

(65) Prior Publication Data
US 2008/0320083 A1 Dec. 25, 2008

(30) Foreign Application Priority Data
Oct. 28, 2005 (EP) .................................. 05110144

(51) Int. Cl.
*H04B 7/00* (2006.01)
(52) U.S. Cl. ........................................ 455/518; 709/205
(58) Field of Classification Search .................. 455/518
See application file for complete search history.

(56) References Cited

U.S. PATENT DOCUMENTS

| 4,625,081 | A * | 11/1986 | Lotito et al. ............... 379/88.26 |
| 6,522,655 | B1 * | 2/2003 | Laiho ............................. 370/410 |
| 6,850,496 | B1 * | 2/2005 | Knappe et al. ................ 370/260 |
| 6,915,331 | B2 * | 7/2005 | Fuller et al. .................... 709/204 |
| 6,988,126 | B2 * | 1/2006 | Wilcock et al. ............... 709/204 |
| 7,023,813 | B2 * | 4/2006 | Newberg et al. .............. 370/312 |
| 7,107,017 | B2 * | 9/2006 | Koskelainen et al. ........ 455/90.2 |
| 7,281,051 | B2 * | 10/2007 | Whynot et al. ............... 709/229 |
| 7,334,017 | B2 * | 2/2008 | Hawkes et al. ............... 709/205 |
| 7,415,284 | B2 * | 8/2008 | Hoover et al. ................ 455/518 |
| 7,490,169 | B1 * | 2/2009 | Ogdon et al. ................. 709/248 |
| 7,516,410 | B2 * | 4/2009 | Thompson et al. ........... 715/753 |
| 7,558,286 | B2 * | 7/2009 | Khatter ......................... 370/468 |
| 7,558,736 | B2 * | 7/2009 | Thalanany et al. ........... 704/275 |
| 7,586,857 | B2 * | 9/2009 | Ejzak et al. ................... 370/260 |

(Continued)

FOREIGN PATENT DOCUMENTS
WO WO 2006032940 A1 * 3/2006

*Primary Examiner* — Yuwen Pan
*Assistant Examiner* — Hai Nguyen

(57) ABSTRACT

A method and apparatus for processing a floor request in a push to talk type service in which a floor is required for a first terminal to distribute media to a second terminal. The first terminal sends a floor request message to a PoC Server. The message relates to at least two different types of media content and indicates how and to what extent the granting or denial of the different media types interrelate. The message may indicate, for example, that if a first media type is denied, the others should be denied; or that the granting or denial of the first media type should not affect the other media types. The message may also indicate other conditions and relationships. The PoC Server processes the request based on the indicated interrelationships and/or conditions, and grants or denies each media type.

14 Claims, 3 Drawing Sheets

U.S. PATENT DOCUMENTS

| | | |
|---|---|---|
| 7,593,359 B2 * | 9/2009 | Eneroth et al. ............... 370/312 |
| 7,620,737 B2 * | 11/2009 | Newman et al. ............. 709/250 |
| 7,640,300 B2 * | 12/2009 | Wohlgemuth et al. ........ 709/204 |
| 7,650,159 B2 * | 1/2010 | Poikselka .................... 455/518 |
| 7,668,515 B2 * | 2/2010 | Mayblum et al. ............ 455/90.2 |
| 7,697,950 B2 * | 4/2010 | Jin et al. ....................... 455/518 |
| 7,711,381 B2 * | 5/2010 | Sung et al. ................... 455/518 |
| 7,720,498 B2 * | 5/2010 | Lee ............................... 455/518 |
| 7,844,293 B2 * | 11/2010 | Sung et al. ................... 455/518 |
| 7,889,726 B2 * | 2/2011 | Poikelka et al. ............. 370/389 |
| 7,899,865 B2 * | 3/2011 | Banner et al. ................ 709/204 |
| 2003/0055974 A1 * | 3/2003 | Brophy et al. ............... 709/227 |
| 2003/0105820 A1 * | 6/2003 | Haims et al. ................. 709/205 |
| 2003/0126211 A1 * | 7/2003 | Anttila et al. ................ 709/205 |
| 2003/0182374 A1 * | 9/2003 | Haldar .......................... 709/205 |
| 2004/0133683 A1 * | 7/2004 | Keller et al. ................. 709/227 |
| 2004/0230655 A1 * | 11/2004 | Li et al. ........................ 709/205 |
| 2005/0124365 A1 * | 6/2005 | Balasuriya et al. ........... 455/518 |
| 2005/0141541 A1 * | 6/2005 | Cuny et al. ................... 370/437 |
| 2005/0165894 A1 * | 7/2005 | Rosenberg et al. ........... 709/205 |
| 2006/0003740 A1 * | 1/2006 | Munje ........................ 455/412.1 |
| 2006/0034260 A1 * | 2/2006 | Svedberg et al. ............. 370/352 |
| 2006/0073795 A1 * | 4/2006 | Mayblum et al. ............ 455/90.2 |
| 2006/0126635 A1 * | 6/2006 | Alberth et al. ............. 370/395.2 |
| 2006/0153102 A1 * | 7/2006 | Kuure et al. .................. 370/263 |
| 2006/0270361 A1 * | 11/2006 | Szymanski et al. .......... 455/90.2 |
| 2007/0010275 A1 * | 1/2007 | Kiss ............................. 455/521 |
| 2007/0021138 A1 * | 1/2007 | Allen et al. ................... 455/518 |
| 2007/0203984 A2 * | 8/2007 | AlHusseini et al. .......... 709/205 |
| 2007/0281681 A1 * | 12/2007 | Holm ......................... 455/422.1 |
| 2008/0020718 A1 * | 1/2008 | Jin et al. ....................... 455/90.2 |
| 2008/0250336 A1 * | 10/2008 | Gusler et al. ................. 715/753 |
| 2008/0268792 A1 * | 10/2008 | Munje .......................... 455/90.2 |
| 2009/0203331 A1 * | 8/2009 | Ranalli et al. ................ 455/90.2 |
| 2009/0298487 A1 * | 12/2009 | Przybysz et al. ............. 455/416 |
| 2010/0011300 A1 * | 1/2010 | AlHusseini et al. .......... 715/747 |

* cited by examiner

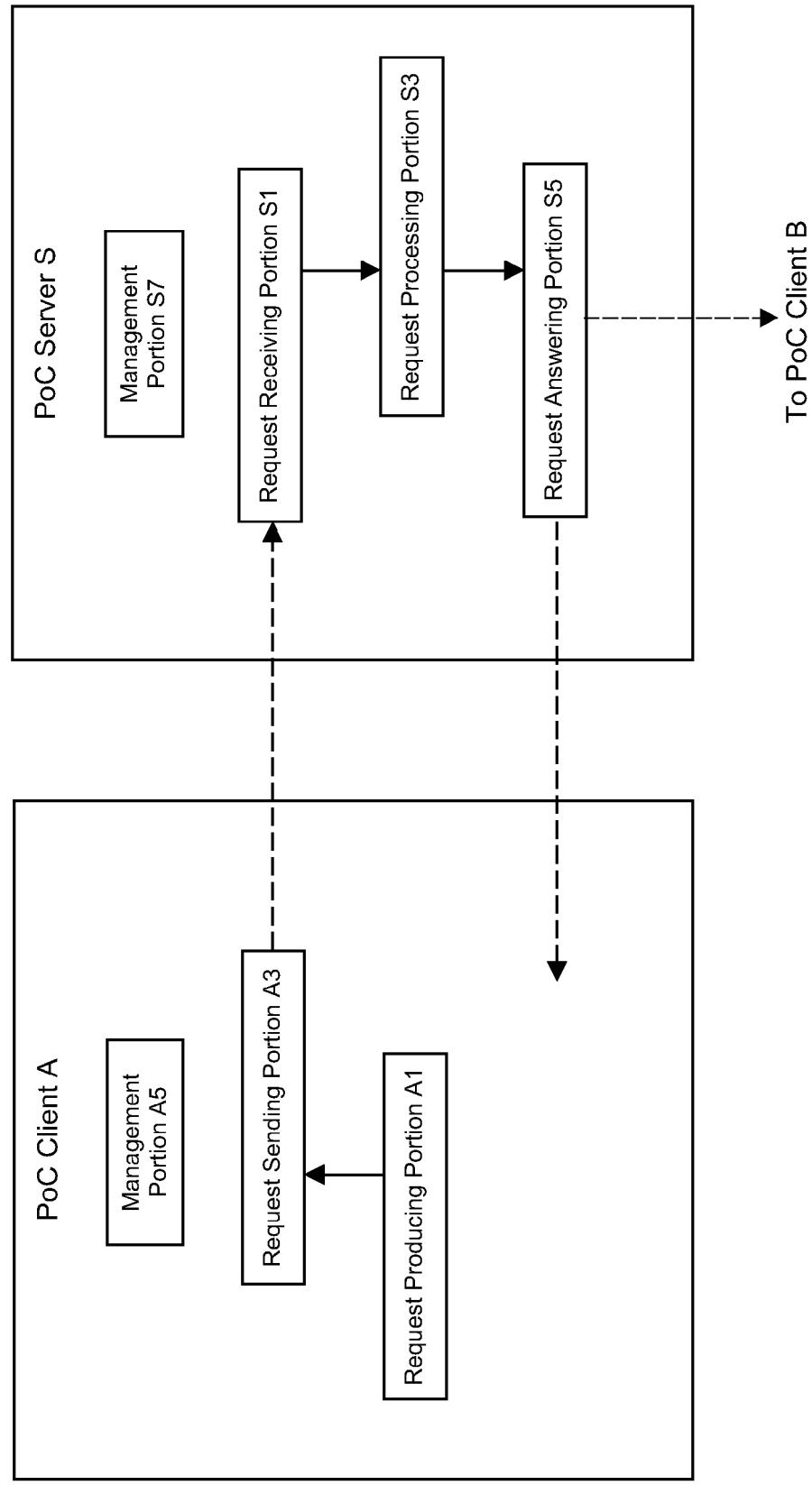

METHODS AND APPARATUS FOR PUSH TO TALK TYPE SERVICE

This application claims the benefit of European Patent Application No. 05110144.2, filed Oct. 28, 2005, the disclosure of which is fully incorporated herein by reference.

BACKGROUND OF THE INVENTION

1. Field of the Invention

The present invention relates to methods and apparatus for use in a push-to-talk type service, for example a so-called Push to talk Over Cellular service.

2. Description of the Related Art

Walkie-talkie type services have long proved popular amongst users who wish to communicate brief messages quickly between one another. Conventionally, such services have been provided by two-way portable radios which utilize a dedicated part of the radio spectrum, but which only allow users to communicate with a small group of pre-selected users who utilize similar terminals and who are within range of the relatively short operating range of the radios. More recently, services have been introduced into the United States which piggy-back on the existing cellular telephone infrastructure. However, these services have been proprietary in nature and have not allowed users to communicate between different operator networks.

In an attempt to broaden the use of walkie-talkie type services, an industry group known as the Open Mobile Alliance (www.openmobilealliance.org) has been established with the aim of standardizing suitable protocols which will allow inter-network operability for Walkie-Talkie services offered over cellular networks. The service established by the various standards is known as Push to talk Over Cellular (PoC). PoC proposes that associated speech data will be transported over a packet switched access network. In the case of GSM and UMTS, this packet switched access network will be the general packet radio service (GPRS) or 3G access network. In other network architectures, analogous packet switched access networks will be utilized for transporting talk data. Push-to-talk (PTT) services may also be offered over circuit switched access networks, although this is not the preferred option.

The Push to talk Over Cellular (PoC) system is typically implemented on GSM/GPRS/3G networks and makes use of the IP Multimedia Subsystem (IMS) standardized by the 3rd Generation Partnership Project to facilitate the introduction of advanced data services into cellular networks, particularly, real-time multimedia services. The IMS relies upon the Session Initiation Protocol (SIP) which has been defined by the Internet Engineering Task Force (IETF) for the setting up and control of multimedia IP-based sessions. A PoC Server is located within the IMS or is attached thereto, and implements the functionality for setting up and controlling PoC Sessions.

Existing push-to-talk (PTT) and conferencing systems typically use a control mechanism to grant one of the users the right to speak while other users in the communication are denied such right and are in listening mode. Such control mechanism is typically referred to by various synonymous terms such as "floor control," "talker arbitration," "talk burst control", etc. For example, the Open Mobile Alliance (OMA) is currently working on a specification of Push to talk Over Cellular (PoC) system, which includes Talk Burst Control Protocol (TBCP).

To request the right to speak on behalf of the user, the terminal (PoC Client) typically sends a request message to the controller (PoC Server). The controller typically responds either granting or rejecting the request. The controller restricts the time the user is allowed to talk, typically by starting an allowed talk timer when it grants the request, and uses some mechanism to interrupt the user's talk, typically by sending a revoke talk message to the user's terminal or by simply not forwarding the user's media. The user who is interrupted by the controller is typically penalized by the controller in some way, e.g. by not granting the user the right to speak for a certain period of time.

The next version of OMA PoC (herein called "PoC 2", with the previous version being called "PoC 1") is evolving in OMA. Part of the planned functionality is to include new types of media such as pictures, video, etc., that can be shared within a PoC Session. Each media type shall have its own floor control. The following extract is from the OMA PoC 2 Requirement Document [OMA-RD-PoC-V2-0-20050902-D, Push to Talk Over Cellular 2 Requirements, Draft Version 2.0-02, September 2005]: "If a session includes video steams (and talk burst), the PoC infrastructure SHOULD support a capability to configure a preferred mode of video streaming on the PoC Client. This configuration may be done either: (a) due to the limitations of the PoC client (e.g. a PoC 1 client), configured by the Service Provider; or (b) configured by the user". Also from the OMA PoC 2 Requirement Document: "The modes of sending video streams in conjunction with voice are: (i) Single source mode: Both PoC voice and PoC video comes from the same Participant in a PoC Session in near real time; and (ii) Multiple sources mode: PoC voice is sent from one Participant and PoC video is sent from another Participant in the same PoC Session". Also from the OMA PoC 2 Requirement Document: "If the Media Burst Control is applicable for the media type the PoC network elements SHALL support capability for an independent Media Burst Control for each media in a PoC Session. Media Burst Control SHALL be applicable to all Continuous Media Types and SHOULD be applicable to the Discrete Media types involved in a PoC session. Note: Discrete Media types should only use Media Burst Control, if it is essential for the application using PoC enabler". Also from the OMA PoC 2 Requirement Document: "If the Media Burst Control is applicable for the media type the PoC network elements SHALL support capability for one Media Burst Control for multiple media in a PoC Session".

PoC 1 only has a monolithic floor control, i.e., for only one media type: the talk burst. PoC 2 expands the media handling to include other media types such as video. The PoC requirements state that there needs to be a mechanism that synchronizes the floor for different media so that it is possible for a user to send talk burst and video stream at the same time, as well as the opposite when one user sends the talk burst while another sends a video stream.

One possible approach to implementing multiple media burst control is illustrated in FIG. 1 of the accompanying drawings. FIG. 1 shows a PoC Client PC in communication with a PoC Server PS. In step P1, a Talk Burst Request for Voice media is sent from PoC Client PC to PoC Server PS. In step P2, a Talk Burst Request for a Video stream is sent from PoC Client PC to PoC Server PS. In step P3, the Talk Burst request for Voice media is denied or granted, with a message sent from PoC Server PS to PoC Client PC. In step P4, the Talk Burst request for Video stream is denied or granted, with a message sent from PoC Server PS to PoC Client PC.

However, the approach illustrated in FIG. 1 is not ideal because the floors are not coordinated and it may be that the user is not interested in a case where only one of the media types is granted.

Another problem with the existing solution in OMA PoC 1 is that when someone is granted the right to send a Talk Burst, the PoC Server is expecting the Talk Burst to be sent from the PoC Client that sent the Talk Burst request. Therefore, the PoC Server will discard any Talk Burst sent from any another PoC Client.

When introducing the possibility of sending pictures, video or any other media content, a PoC Client may request the floor for one media type on behalf of another PoC Client. For example, if the requesting PoC Client wishes to talk while another PoC Client will provide the picture, coordination of the floor is required between audio and the picture.

It is desirable to address the above-mentioned issues.

SUMMARY OF THE INVENTION

According to a first aspect of the present invention, there is provided a method for use in a push-to-talk type service, in which a floor is required for a terminal to distribute media content to another terminal participating in a push-to-talk type session. The method comprising sending a floor request message relating to at least two different types of media content.

The floor request message may indicate, for at least one of the media types, how and/or the extent to which the allowance or denial of the request relating to that media type affects and/or depends upon the request relating to at least one other media type.

The floor request message may indicate, for at least one of the media types, how and/or the extent to which the allowance or denial of the request relating to that media type affects and/or depends upon the allowance or denial of the request relating to at least one other media type.

The floor request message may indicate, for at least one of the media types, that if the request relating to that media type is denied, then the request relating to any other media type should also be denied.

The floor request message may indicate, for at least one of the media types, that the allowance or denial of the request relating to that media type should not affect the allowance or denial of the request relating to any other media type.

The floor request message may indicate, for at least one of the media types, that the request relating to that media type should only be allowed if the request relating to at least one other specified media type is allowed.

The floor request message may indicate, for at least one of the media types, that the request relating to that media type should be allowed or denied to the same extent that the request relating to at least one other specified media type is allowed or denied.

The floor request message may indicate, for at least one of the media types, how and/or the extent to which the allowance or denial of the request relating to that media type depends upon at least one specified influence factor, such as the number of participants that would receive that media type or the estimated transfer rate for that media type.

The floor request message may indicate, for each of the media types, which terminal is designated to provide that media type over the floor, should the request relating to that media type be allowed.

The floor request message may indicate, for at least one of the media types, that a terminal other than that which sent the floor request message is designated to provide that media type over the floor, should the request relating to that media type be allowed.

The method may comprise processing the floor request message to determine, for each of the at least two media types, whether to allow or deny the request relating to that media type.

The method may comprise, at least for each media type relating to which the request has been allowed, sending a message to that effect to the terminal designated to provide that media type.

The method may comprise sending a message to the terminal that sent the floor request message to indicate, for each media type, whether or not the request relating to that media type has been allowed or denied.

The method may comprise sending a single such message to each terminal, if required.

The method may comprise processing the floor request message to determine, for each of the at least two media types, whether to allow or deny the request relating to that media type.

The method may comprise allowing the floor request message to be varied on the basis of this determination before finally granting or denying the request relating to each media type.

The push-to-talk type service may be a Push to talk Over Cellular service.

The push-to-talk type service may be a conferencing service.

The method may comprise sending a single such floor request message. Or it may comprise sending a plurality of request messages, each message of the plurality relating to at least one of the media types, and the plurality of request messages being considered together.

According to a second aspect of the present invention, there is provided an apparatus for use in a push-to-talk type service, in which a floor is required for a terminal to distribute media content to another terminal participating in a push-to-talk type session. The apparatus comprising means for sending a floor request message relating to at least two different types of media content.

According to a third aspect of the present invention, there is provided a method for use in a push-to-talk type service, in which a floor is required for a terminal to distribute media content to another terminal participating in a push-to-talk type session. The method comprising: receiving and processing a floor request message relating to at least two different types of media content.

According to a fourth aspect of the present invention, there is provided an apparatus for use in a push-to-talk type service, in which a floor is required for a terminal to distribute media content to another terminal participating in a push-to-talk type session. The apparatus comprising means for receiving and processing a floor request message relating to at least two different types of media content.

According to a fifth aspect of the present invention, there is provided an operating program, which, when loaded into an apparatus, causes the apparatus to become an apparatus according to the second or fourth aspect of the present invention.

According to a sixth aspect of the present invention, there is provided an operating program, which, when run on an apparatus, causes the apparatus to carry out a method according to the first or third aspect of the present invention.

The operating program may be carried on a carrier medium. The carrier medium may be a transmission medium. The carrier medium may be a storage medium.

An embodiment of the present invention provides a straightforward method of requesting the floor for several independent media types at the same time, and on another PoC Client's behalf. An embodiment of the present invention also provides the means for coordinating media types in the request. An embodiment of the present invention enables the ability to request floor for multiple media types in a single request and to request floor on another device's (e.g., another PoC Client's) behalf.

BRIEF DESCRIPTION OF THE DRAWINGS

FIG. 4 is a block diagram schematically illustrating parts of the PoC Client and the PoC Server in an embodiment of the present invention.

DETAILED DESCRIPTION OF THE PREFERRED EMBODIMENTS

According to one embodiment of the present invention, a single request message is used to ask for permission to send one or more media types. In other words, a single request message is used to request multiple floors.

For each media type, there may be an indication of whether the media type is required or merely preferred. If a media type is preferred and the PoC Server cannot grant permission to send this media type, then the request can be granted anyway (for other media types). If a media type is required and the PoC Server cannot grant permission to send this media type, then the PoC Server would deny the request even if some of the other media types are available.

It is also possible to provide an indication of which participating terminal will be sending a particular media type. This indication makes it possible to request permission to send media on behalf of another device, e.g. another PoC Client. If a request is granted, and if another device other than the PoC Client who requested the floor is to be the source for a particular media type, then the PoC Server would send a message to that other device to inform it about permission being granted for that media type.

Figure 1:
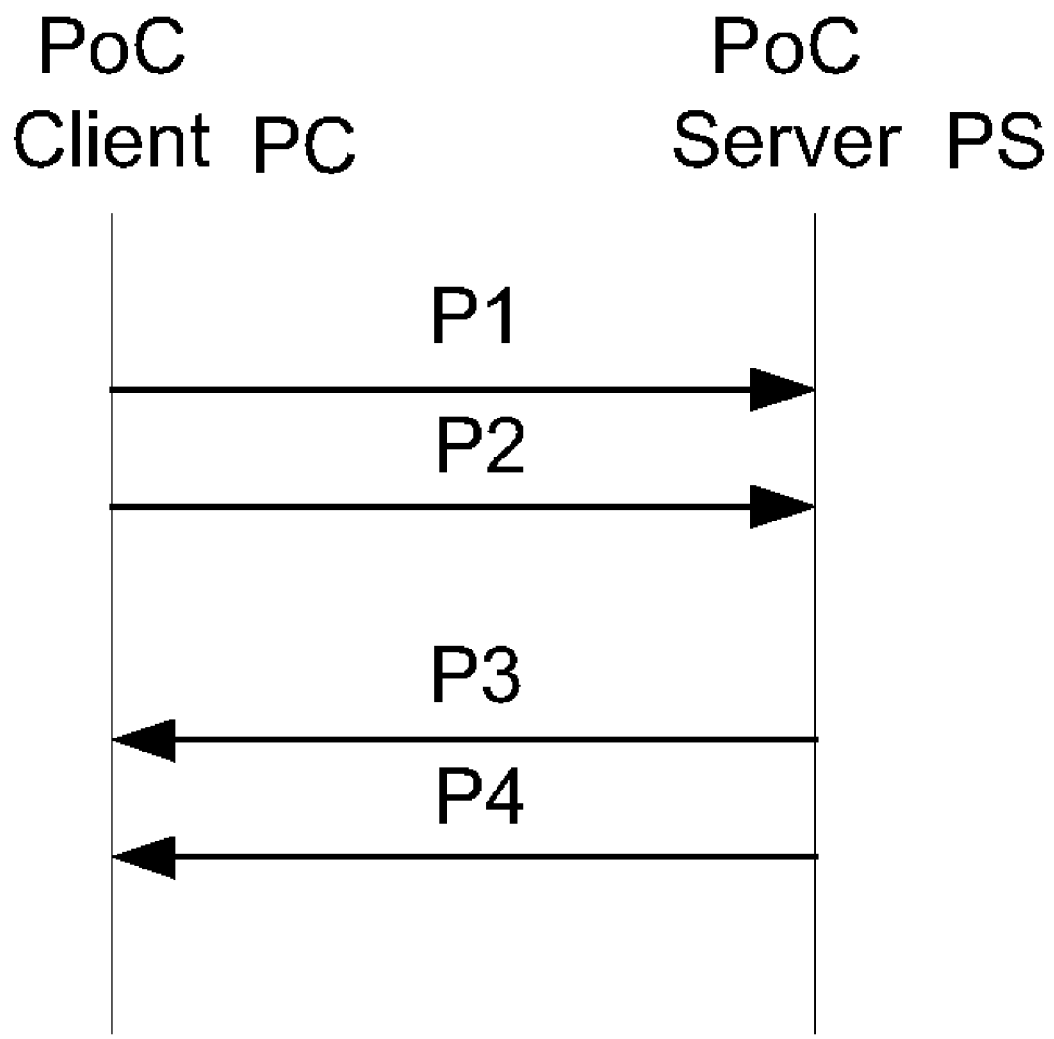
FIG. 1, discussed hereinbefore, schematically illustrates one possible approach to implementing multiple media burst control involving a PoC Client and a PoC Server.
Figure 2:
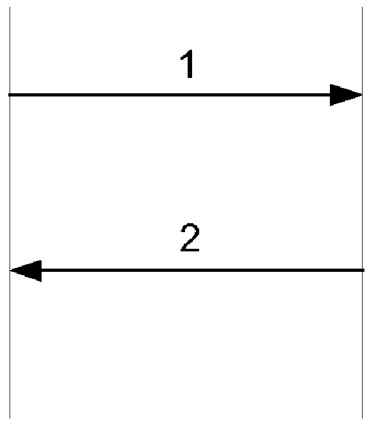
FIG. 2 is a message exchange diagram illustrating the exchange of messages in an embodiment of the present invention between a PoC Client and a PoC Server in one possible scenario.
Figure 3:
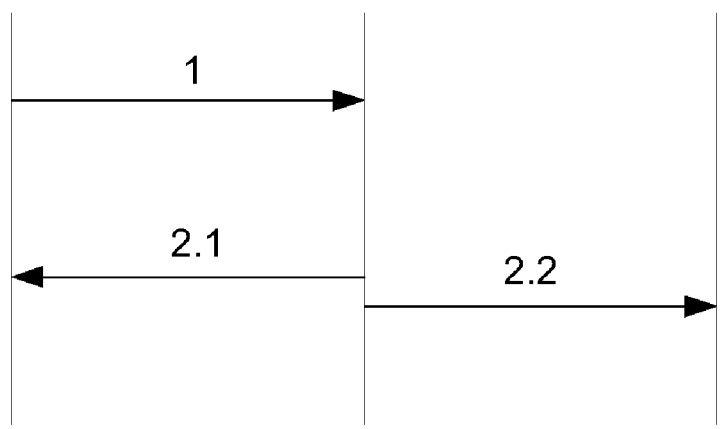
FIG. 3 is a message exchange diagram illustrating the exchange of messages in an embodiment of the present invention between two PoC Clients and a PoC Server in another possible scenario.

An embodiment of the present invention will now be described in more detail with reference to FIGS. 2, 3 and 4. FIG. 2 is a message exchange diagram illustrating the exchange of messages between a PoC Client A and a PoC Server S in one possible scenario, while FIG. 3 is a message exchange diagram illustrating the exchange of messages between PoC Clients A and B and PoC Server S in another possible scenario. FIG. 4 is a block diagram schematically illustrating parts of the PoC Client A and the PoC Server S. In FIG. 4, the PoC Client A comprises a Request Producing Portion A1 and a Request Sending Portion A3; these parts operate under overall control of a Management Portion A5. PoC Server S comprises a Request Receiving Portion S1, a Request Processing Portion S3, and a Request Answering Portion S5; these parts operate under overall control of a Management Portion S7.

In the first scenario as illustrated in FIG. 2, the PoC Client A is requesting permission to send both voice and video media content over the floor. In this scenario, PoC Client A specifies that both media types are required; in other words, if both media types cannot be granted at the same time, then the PoC Server S should deny the request relating to both media types, even if the floor for one of the media types is available.

In step 1, the Request Sending Portion A3 of the PoC Client A sends a floor request message relating to both types of media content, video and voice. The floor request message indicates how, or the extent to which, the allowance or denial of the request relating to one of the media types should affect the allowance or denial of the request relating to the other media type. The request message is prepared by the Request Producing Portion A1.

In this example, the request message indicates that if the request relating to the video media type is denied, then so should the request for the voice media type, and vice versa. In other words, both media types are required.

The request message could alternatively express the information in the sense that the request relating to the voice media type should only be allowed if the request relating to the video media type is allowed.

Or, the request message could indicate that the request relating to the video media type should be allowed or denied to the same extent that the request relating to the voice media type is allowed or denied, i.e. that the voice and video media types should be considered as a group or set that should be allowed or denied together, irrespective of the allowance or denial of any other media types represented in the request message.

The floor request message could also indicate, for at least one of the media types, how and/or the extent to which the allowance or denial of the request relating to that media type depends upon at least one specified influence factor. An influence factor could be, for example, the number of participants that would receive that media type, so that the request should only be allowed if it will be distributed to more than a specified number of participants. Or an influence factor could relate to the estimated transfer rate for that media type, so that the request should only be allowed if the transfer will be rapid enough.

The manner of expressing this information, such as the inter-dependence between the media types represented in the request message and the conditions required for allowance or denial, is not important. The manner of expressing this information would be readily apparent to the skilled person.

Following receipt of the request message at the Request Receiving Portion S1 of the PoC Server S, the request message is passed to the Request Processing Portion S3 so that the information in the request can be extracted and interpreted, and so that a decision can be made as to whether the request can be allowed or denied, and to what extent.

From the message in this example in FIG. 2 it is determined that both the voice and video media types are required by the PoC Client A. It is also determined that the floor for voice is idle and the floor for video is idle, so that it is possible to grant the request relating both to the voice and the video media types.

In step 2 (FIG. 2), therefore, the Request Answering Portion S5 (FIG. 4) sends a message back to the PoC Client A to indicate that a floor is granted for both voice and video.

In an alternative scenario, it could be determined by the Request Processing Portion S3 that both the voice and video media types are required by the PoC Client A (as for the previous scenario), but also that the floor for voice, or the floor for video, is busy. It is therefore not possible to grant the request relating to both to the voice and the video media types, and in step 2 (FIG. 2), the Request Answering Portion S5 would send a message back to the PoC Client A to indicate that the floor is denied for both voice and video (or a blanket denial message).

Although in the above-described embodiment, the PoC Server S grants or denies the request relating to each media type, and then sends a message back to PoC Client A to indicate its decision, it is also possible that the PoC Server S instead sends an initial response back to the PoC Client A to indicate which media types are available, and which media types are not (without yet granting or denying any of the requests). This would give the PoC Client A the option to confirm the original request (for example if certain or all media types are available), or vary the request with a different combination of media types and associated conditions. Confirmation from the PoC Client A could be explicit or implicit (e.g., assumed confirmed after a predetermined time without explicit confirmation).

In another scenario as illustrated in FIG. 3, the PoC Client A is again requesting permission to send both voice and video media content over the floor. In this scenario, PoC Client A specifies that the voice media type is required, while the video media type is merely optional or preferred. In other words, if the voice media type cannot be granted, then the PoC Server S should deny the request relating to both media types, even if the floor for the video media type is available. On the other hand, if the video media type cannot be granted, then the PoC Server S should still allow the request relating to the voice media type, if possible.

In this scenario in FIG. 3, the PoC Client A is also requesting the floor for video on behalf of PoC Client B, so that if the floor for video is granted then it should be PoC Client B that provides the video content over the granted floor.

In step 1 in FIG. 3, the Request Sending Portion A3 of the PoC Client A sends a floor request message relating to both types of media content, video and voice. The request message indicates that voice is required and that video is merely optional. The request message also indicates that PoC Client B is designated to provide the video media type over the floor, should the request relating to the video media type be allowed. (The request message could either explicitly indicate that PoC Client A is designated to provide the voice media type over the floor, should the request relating to the voice media type be allowed, or it could do so implicitly in the absence of an explicit indication since PoC Client A is the sender of the request message.) The request message is prepared by the Request Producing Portion A1.

Following receipt of the request message at the Request Receiving Portion S1 of the PoC Server S, the request message is passed to the Request Processing Portion S3 so that the information in the request can be extracted and interpreted, and so that a decision can be made as to whether the request can be allowed or denied, and to what extent.

From the message in this example in FIG. 3, it is determined that the voice media type is required, and it is PoC Client A who will provide it. It is also determined that the video media type is optional, and it is PoC Client B who will provide it. Further, it is determined that the floor for voice is idle and the floor for video is idle, so that it is possible to grant the request relating both to the voice and the video media types.

In step 2.1, therefore, the Request Answering Portion S5 sends a message back to PoC Client A to indicate that a floor is granted for voice, and in step 2.2 a message is sent to PoC Client B to indicate that a floor is granted for video.

In an alternative scenario with reference to FIG. 3, it could be determined by the Request Processing Portion S3 that the floor for video is busy while the floor for voice is idle. Since video is optional, it is still possible to grant the request relating to voice. Therefore, in step 2.1, the Request Answering Portion S5 would send a message back to the PoC Client A to indicate that the floor is granted for voice. No message would be sent to PoC Client B in step 2.2 since the request relating to video was denied.

In yet another scenario with reference to FIG. 3, it could be determined by the Request Processing Portion S3 that the floor for voice is busy while the floor for video is idle. Since voice is required, it is not possible to grant the request relating to video even though the floor is available. Therefore, in step 2.1, the Request Answering Portion S5 would send a message back to the PoC Client A to indicate that the request is denied (i.e., both for video and for voice). No message would be sent to PoC Client B in step 2.2 since the request relating to video was denied.

Although an embodiment of the present invention is described above in relation to PoC, it will be appreciated that the invention is not limited to PoC. The term "push-to-talk service" is used here to identify services of a walkie-talkie nature. These are services that allow two or more users to be connected together quickly for the exchange of talk bursts. Push-to-talk services differ from conventional voice calls in that these services allow only one person to talk at a given time. In order to talk, users must have control of the "floor". Control is typically achieved by one user releasing a talk button to release floor control, and another user pressing a talk button to assume floor control. It is to be understood that the term "push to talk" used in the appended claims is not intended to imply the use of any particular protocol.

It is also to be understood that the scope of the present invention is not limited to the transfer of talk or speech data in a talk session, and the appended claims are to be read as covering the transfer of any type of data in a data transfer session, including, but not limited to, speech data. As such, terminology such as "Talk Burst Request" and "Talk Burst" is not to be interpreted as being limited to talk, i.e. speech data only, but is used for consistency with PoC 1 terminology; such phrases can include within their meaning the transfer of any type of data. In PoC 2, different terminology may be used for concepts that correspond directly with those in PoC 1; for example the phrases "Media Burst Request" and "Media Burst" may be used in PoC 2 instead of the PoC 1 phrases "Talk Burst Request" and "Talk Burst", respectively.

It is also to be understood that the scope of the present invention is intended to include conferencing systems in which a participant is granted floor control and hence the right to speak or transfer data to other participants in the conference.

It will be appreciated that operation of one or more of the above-described components can be controlled by a program operating on the device or apparatus. Such an operating program can be stored on a computer-readable medium, or could, for example, be embodied in a signal such as a downloadable data signal provided from an Internet website. The appended claims are to be interpreted as covering an operating program by itself, or as a record on a carrier, or as a signal, or in any other form.

What is claimed is:

1. A method of requesting a floor in a push to talk type service in which the floor is required for a first terminal to distribute media content to a second terminal participating in a push to talk type session, said method comprising the steps of:

creating in the first terminal, a floor request message requesting a given type of media content and at least one different type of media content, wherein the floor request message indicates, for the given media type, a manner or extent to which allowance or denial of the request for the given media type affects or depends upon allowance or denial of the request for the at least one different media type, wherein the floor request message indicates that if the request for the given media type is denied, the request for the at least one different media type should also be denied, and the floor request message indicates that the request for the given media type should only be allowed if the request for the at least one different media type is allowed; and sending the floor request message from the first terminal to a server controlling the push to talk type session.

2. The method as claimed in claim 1, wherein the floor request message indicates, for the given media type, that the request for the given media type should be allowed or denied to a same extent that the request for the at least one different media type is allowed or denied.

3. The method as claimed in claim 1, wherein the floor request message indicates, for each of the media types, which terminal is designated to provide each media type over the floor, if the request for each media type is allowed.

4. A method of requesting a floor in a push to talk type service in which the floor is required for a first terminal to distribute media content to a second terminal participating in a push to talk type session, said method comprising the steps of:

creating in the first terminal, a floor request message requesting at least two different types of media content, wherein the floor request message indicates:

which terminal is designated to provide each media type over the floor if the request for each media type is allowed;

wherein the floor request message indicates, for a given media type, that the second terminal is designated to provide the given media type over the floor if the request for the given media type is allowed;

for a given media type, a manner or extent to which allowance or denial of the request for the given media type depends upon at least one specified influence factor, wherein the specified influence factor is selected from a group consisting of a number of participants that would receive the given media type and an estimated transfer rate for the given media type; and sending the floor request message from the first terminal to a server controlling the push to talk type session.

5. The method as claimed in claim 4, further comprising processing the floor request message by the server to determine, for each of the at least two different media types, whether to allow or deny the request relating to each of the different media types.

6. The method as claimed in claim 5, further comprising, for each allowed media type, sending a message from the server to the terminal designated to provide the allowed media type indicating the allowed media type.

7. The method as claimed in claim 5, further comprising sending a message from the server to the first terminal to indicate which media types have been allowed or denied.

8. The method as claimed in claim 5, further comprising:

sending a response message from the server to the first terminal, said response message indicating which media types are allowed and which media types are denied;

creating a modified floor request message by the first terminal based on the allowed and denied media types, said modified floor request message including a different combination of requested media types than the media types requested in the floor request message and associated conditions; and processing the modified floor request message by the server to determine, for each of the media types, whether to allow or deny the request for each media type.

9. The method as claimed in claim 4, wherein the push to talk type service is a push to talk over cellular service.

10. The method as claimed in claim 4, wherein the push to talk type service is a conferencing service.

11. An apparatus for requesting a floor in a push to talk type service in which the floor is required for a first terminal to distribute media content to a second terminal participating in a push to talk type session, said apparatus comprising:

means for creating in the first terminal, a floor request message requesting at least two different types of media content, wherein the floor request message indicates, for a given media type, a manner or extent to which allowance or denial of the request for the given media type affects or depends upon the request for at least one different media type;

wherein the message creating means is configured to create a floor request message that indicates that the request for the at least one different media type should be denied if the request for the given media type is denied; and wherein the message creating means is configured to create a floor request message that indicates that the request for the given media type should only be allowed if the request for the at least one different media type is allowed; and means for sending the floor request message from the first terminal to a server controlling the push to talk type session.

12. A method of processing a floor request message in a push to talk type service, in which a floor is required for a terminal to distribute media content to another terminal participating in a push to talk type session, said method comprising the steps of:

receiving from a first terminal, a floor request message requesting at least two different types of media content, wherein the floor request message indicates, for each media type, a manner or extent to which allowance or denial of the request for each media type affects or depends upon the request for at least one different media type, wherein the floor request message indicates that if the request for the given media type is denied, the request for the at least one different media type should also be denied, and the floor request message indicates that the request for the given media type should only be allowed if the request for the at least one different media type is allowed;

granting or denying the request for each media type based on the floor request message.

13. An apparatus for processing a floor request message in a push to talk type service, in which a floor is required for a terminal to distribute media content to another terminal participating in a push to talk type session, said apparatus comprising:

means for receiving from a first terminal, a floor request message requesting at least two different types of media content, wherein the floor request message indicates, for each media type, a manner or extent to which allowance or denial of the request for each media type affects or depends upon the request for at least one different media type, wherein the floor request message indicates that if the request for the given media type is denied, the request for the at least one different media type should also be denied, and the floor request message indicates that the request for the given media type should only be allowed if the request for the at least one different media type is allowed; and means for granting or denying the request for each media type based on the floor request message.

14. An apparatus for requesting a floor in a push to talk type service in which the floor is required for a first terminal to distribute media content to a second terminal participating in a push to talk type session, said apparatus comprising:

means for creating in the first terminal, a floor request message requesting at least two different types of media content, wherein the floor request message indicates;

which terminal is designated to provide each media type over the floor if the request for that media type is allowed; and for a given media type, that the second terminal is designated to provide the given media type over the floor if the request for the given media type is allowed; and for a given media type, a manner or extent to which allowance or denial of the request for the given media type depends upon at least one specified influence factor, wherein the specified influence factor is selected from a group consisting of a number of participants that would receive the given media type and an estimated transfer rate for the given media type; and means sending the floor request message from the first terminal to a server controlling the push to talk type session.

* * * * *